United States Patent [19]
Agram et al.

[11] Patent Number: 5,582,077
[45] Date of Patent: Dec. 10, 1996

[54] SYSTEM FOR BALANCING AND DAMPING A TURBOJET ENGINE DISK

[75] Inventors: Daniel A. Agram, Melun; Philippe Bodet, Villeneuve La Guyard; François G. Dhyser, Le Mee Sur Seine; Gérard D. Prigent, Paris, all of France

[73] Assignee: Societe Nationale d'Etude et de Construction de Moteurs d'Aviation "Snecma", Paris, France

[21] Appl. No.: 393,358

[22] Filed: Feb. 23, 1995

[30] Foreign Application Priority Data

Mar. 3, 1994 [FR] France .................. 94 02441

[51] Int. Cl.$^6$ .................................. F16F 15/22
[52] U.S. Cl. .............. 74/573 R; 416/144; 416/145; 403/318; 403/348
[58] Field of Search .................. 74/572, 573 R; 416/144, 145; 285/376, 377; 403/316, 317, 318, 348

[56] References Cited

U.S. PATENT DOCUMENTS

| | | | |
|---|---|---|---|
| 2,893,694 | 7/1959 | Waggener | 285/376 |
| 3,181,835 | 5/1965 | Davis . | |
| 3,881,844 | 5/1975 | Hennessey et al. | 416/145 |
| 3,888,601 | 6/1975 | Glassburn | 416/144 |
| 4,477,226 | 10/1984 | Carreno . | |
| 4,803,893 | 2/1989 | Bachinski | 74/573 R |
| 4,817,455 | 4/1989 | Buxe | 74/573 R |
| 4,835,827 | 6/1989 | Marra | 74/573 R |
| 4,848,182 | 7/1989 | Novotny . | |
| 4,905,576 | 3/1990 | Reynolds | 403/348 |
| 4,926,710 | 5/1990 | Novotny | 74/573 R |
| 5,373,922 | 12/1994 | Marra | 74/573 R |

FOREIGN PATENT DOCUMENTS 2674569  10/1992  France .

*Primary Examiner*—Charles A. Marmor
*Assistant Examiner*—Chong H. Kim
*Attorney, Agent, or Firm*—Oblon, Spivak, McClelland, Maier & Neustadt, P.C.

[57] ABSTRACT

A rotor disk arrangement for a turbojet engine includes a balancing and damping system which has a ring having a circumferential surface recessed with housings and balance masses respectively positioned in the housings. A disk having a circumferential surface is provided which engages the circumferential surface of the ring. The circumferential surfaces are provided with a plurality of bayonet couplings, the couplings including a tenon and a groove engaged with the tenon. The groove includes a straight entrance portion which is substantially parallel to the axis of the engine and a crooked hind part which is substantially circumferentially positioned in the engine. In addition, a plurality of tongues are provided which are respectively inserted into the entrance portions of the grooves and fastened to the ring.

4 Claims, 2 Drawing Sheets

5,582,077

SYSTEM FOR BALANCING AND DAMPING A TURBOJET ENGINE DISK

FIELD OF THE INVENTION

The invention concerns a system for balancing and damping a turbojet engine disk.

BACKGROUND OF THE INVENTION

Turbojet engine rotor disks are balanced in various ways so as to prevent them from vibrating excessively at resonant rates. Firstly, it is possible to provide bosses on a surface of the disk which is deliberately levelled so as to ensure proper balancing. However, balancing systems have in particular been developed in which it is easier to correct the mounted feeder heads linked to the disk. They may be placed in hollow spaces specially provided in the disk, this being the case in the French patent No 2 272 260 where they are forcefully engaged. A further conception described in the French patent No 2 272 260 consists of hooking the feeder heads to the periphery of the disk by a particular nesting system and of locking them by the platforms of the vanes. Finally, French patent No 2 645 902 describes feeder heads engaged at the bottom of broachings in which the vane feet are slid.

One drawback of the first solution mentioned is that mounting of feeder heads takes a relatively long period of time and changes are not strictly possible owing to the forceful engagement. The second solution requires a relatively complicated rotor structure and there is also a third drawback in that it is only applicable to mounted vanes, whereas MVDs or monobloc vaned disks in which the vanes form one element along with the disk are currently in favor.

A further solution described in the American patent U.S. Pat. No. 4,848,182 involves the use of a ring for housing the balancing mass and which is forcefully engaged around the disk, this again being disadvantgageous in that a throat is hollowed out on the disk and thus weakens it. Its aim is to receive a joint which covers the housings of the balancing masses.

Finally, the French patent No 2 545 873 describes a solution where the balancing mass consist of pins introduced at the bottom of adjustment elements of the vanes and fastened by a blow from a punch. Whatever may be the merits of this solution, they add to the drawbacks of those mentioned previously.

SUMMARY OF THE INVENTION

The main advantages of the invention are that the damping and balancing system has a simple structure and allows for easy access to the balancing masses. It can be stapled to a monobloc rotor disk or other element without it being necessary to significantly complicate the shape of the latter, especially by reliefs which would risk giving rise to the risks of rupture by means of fatigue.

The damping and balancing system is characterized in that it includes a ring linked to the disk and touching it via a contact surface on which the balancing mass receiving housings open. The contact surface is a surface radially outside the ring and the disk is linked to the ring and bayonet couplings situated on the contact surface of the ring and an additional contact surface of the disk. These couplings are composed of curved tenons and grooves composed of a portion for engaging the tenons, mainly straight, and in the axis of the rotor, and a crooked portion for locking the heels.

Finally, the system further includes tongues linked to the ring and penetrating into the engagement portions, at least in front of the crooked portions.

Again more advantageously, the tongues are part of a gasket covering a flat face of the ring on which the housings open, the ring and gasket being linked by bolts.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
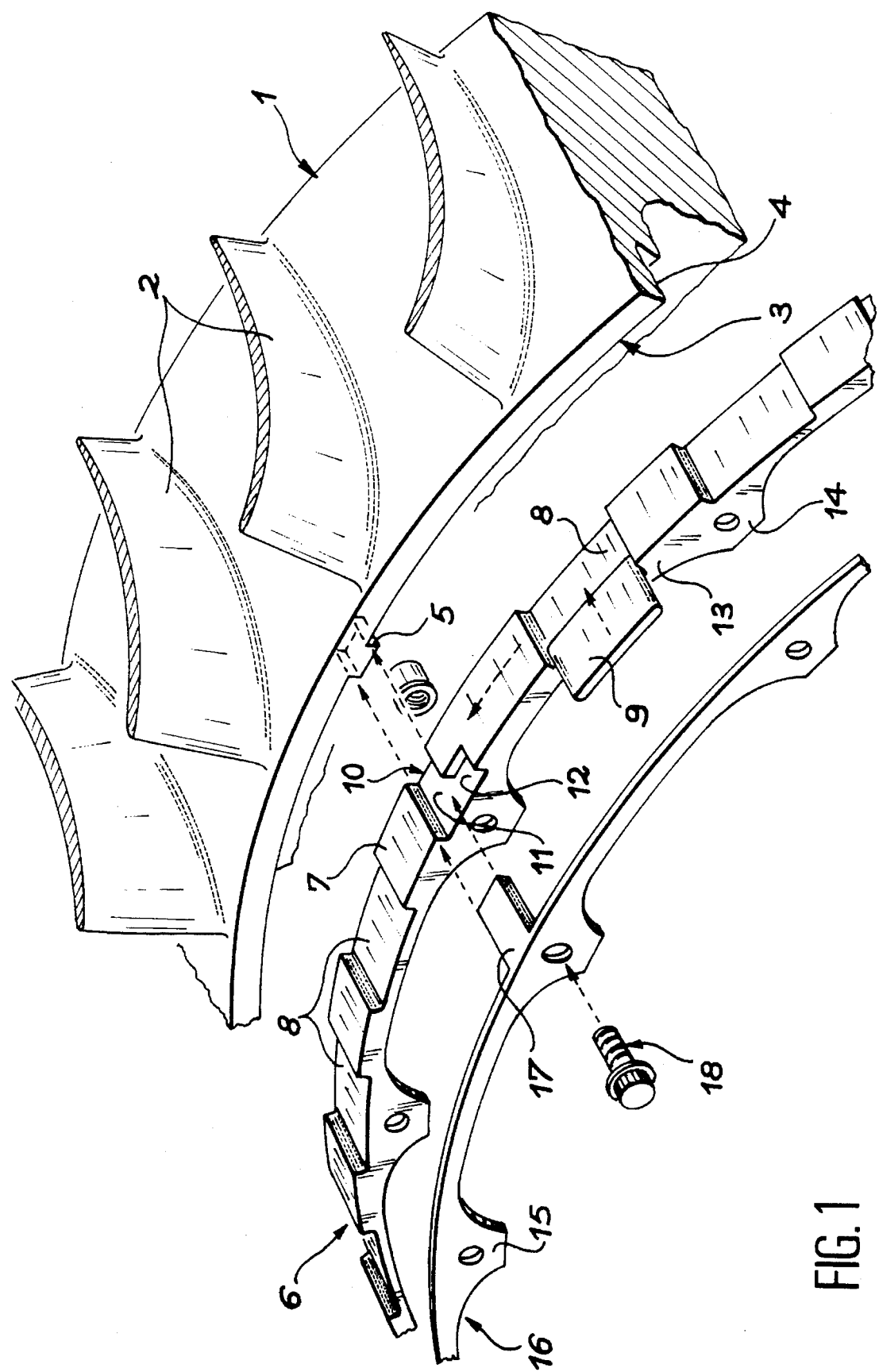
FIG. 1 shows an exploded view of the elements of the system.
Figure 2:
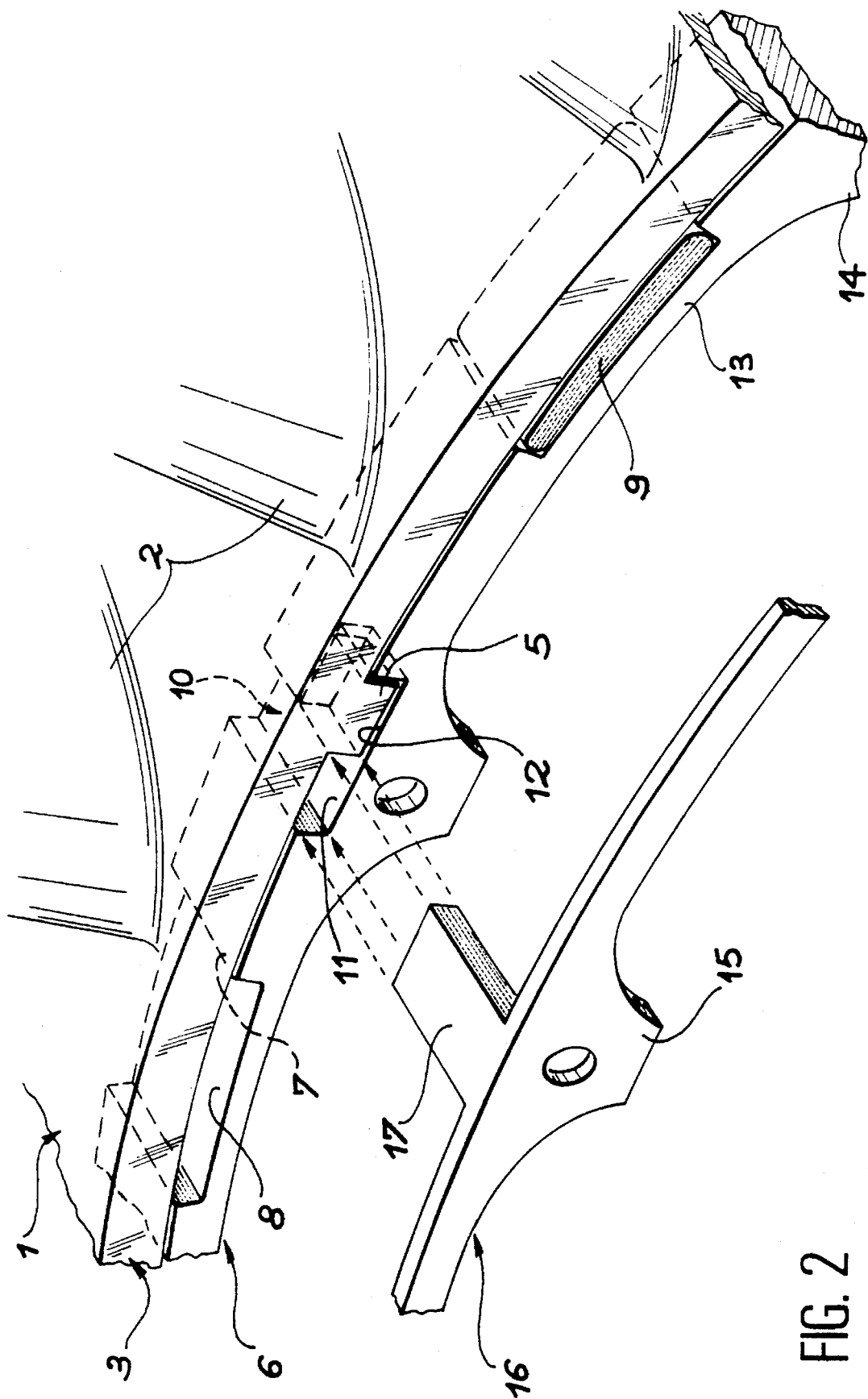
FIG. 2 shows the condition of the system when the ring is mounted on the disk.

A rotor disk 1 described on the figures is a monobloc vaned disk of the outer surface on which the vanes 2 stand up. In the embodiment shown, the outer surface is axially extended on one side so as to form a small ring 3 whose internal radial face 4 is completely smooth if the tenons 5 are excluded.

A thin ring 6 is notched from its radially external face 7 by housings 8 for receiving the balancing masses 9 and by grooves 10 which constitute bayonet couplings with the tenons 5. The curved grooves 10 are composed of one straight portion 11 mainly orientated in the axis of the disk 1 in which a respective tenon 5 placed opposite the grooves is firstly engaged, and a crooked portion 12 in which the tenon 5 is made to penetrate via an angular movement of the ring 6. The engaging portions 11 extend over the entire width of the ring 6 and the housings 8 are open, at least on the flat face 13 of the ring 6 opposite the disk 1. The radial faces 4 and 7 touch and also provision has been made for the flat face of the ring 6 opposite the face 13 to touch a flat face of the disk 1 adjacent to the face 4. The dimensions of the tenons 5 and grooves 10 are then thus provided.

The flat face 13 bears lugs 14 pierced and directed towards the center of the ring. Lugs 15 having the same disposition are located on a gasket 16 which covers, at least partially, the flat face 13 and the openings of the housings 8. The gasket 16 is provided with tongues 17 which penetrate into the portions 11 for engaging the grooves 10, at least in front of the crooked portions 12. Bolts 18 are engaged through the piercings of the lugs 14 and 15 and are tightened. By linking the ring 6/gasket 16 unit, this prohibits extracting the tongues 17 from the grooves 10 and thus the tenons 5 from the crooked portions 12. The locking of the ring 6 is thus guaranteed, even though it slides in the small ring 3. If, however, the bolts are dismantled, it is immediately possible to gain access to the housings 8 and balancing mass 9 as soon as the gasket 16 is withdrawn without it being necessary to dismantle the ring 6. The mounting of the tongues 17 and tenons 5 in the grooves 10 is compatible with a precise mounting of the elements, while allowing small amounts of play to exist which have the advantage of not totally obstructing the clearances of the ring 6 on the disk 1. This results in a certain damping of the vibrations of the disk 1. The balancing masses 9 placed in the housings 8 with a small amount of play have the same damping effect. Finally, as the lugs 14 and 15 are not placed on the disk 1 itself but rather on elements subjected to fewer stresses, no cracking by means of fatigue is caused which produces irregularities in shape which often otherwise happens on highly stressed elements. The tenons 5 are the only genuine reliefs to be added to the disk 1, but such are few in number and are stocky, which ought to resist these stresses.

The bayonet couplings are relatively less numerous on the disk 1 and the ring 6 and in fact only three of them may be disposed there. There are several tens of housings 8 to allow for careful balancing. However, most of them remain empty. There is total freedom to choose the weights of the balancing masses 9.

Obviously, numerous modifications and variations of the present invention are possible in light of the above teachings. It is therefore to be understood that, within the scope of the appended claims, the invention may be practiced otherwise than as specifically described herein.

What is claimed is:

1. A rotor disk arrangement for a turbojet engine, which comprises:

a balancing and damping system comprising a ring having a circumferential surface recessed with housings and balance masses respectively positioned in said housings;

a disk having a circumferential surface which engages the circumferential surface of the ring wherein the circumferential surfaces of the disk and ring comprise a plurality of bayonet couplings, said couplings including a tenon and a groove engaged by the tenon for each of the bayonet couplings, the groove comprising a straight entrance portion which is substantially parallel to an axis of the engine and a crooked hind part which is substantially circumferentially positioned in the engine; and a plurality of tongues respectively inserted into the entrance portions of the grooves and fastened to the ring.

2. A rotor disk arrangement according to claim 1, which comprises a gasket covering a flat surface portion of the ring which faces away from the disk wherein the tongues are integrally connected with said gasket, and wherein the housings opening on said flat surface and the gasket are fastened to the ring by bolts engaging the gasket.

3. A rotor disk arrangement according to claim 1, wherein the tenons are provided on the disk and the grooves are formed in the ring.

4. A rotor disk arrangement according to claim 2, wherein the ring has a plurality of lugs with apertures formed therein and the bolts are respectively located in the apertures of the lugs.

\* \* \* \* \*